May 9, 1950  A. G. MANKE ET AL  2,507,211
PULSE RECEIVER CIRCUIT
Filed Dec. 24, 1942
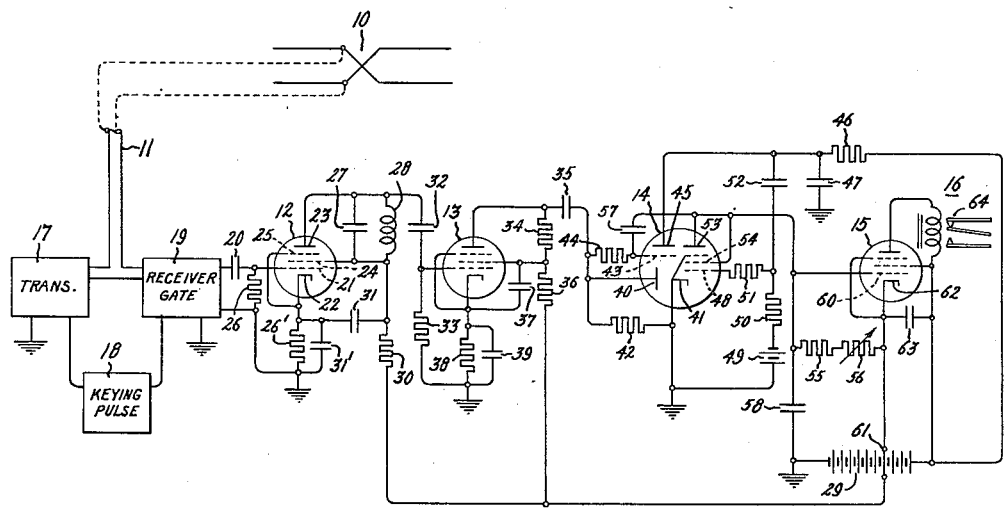
Inventors:
Arthur G. Manke,
Paul C. Gardiner,
by Harry E. Dunham
Their Attorney.

Patented May 9, 1950

2,507,211

UNITED STATES PATENT OFFICE 2,507,211

PULSE RECEIVER CIRCUIT

Arthur G. Manke, Schenectady, and Paul C. Gardiner, Scotia, N. Y., assignors to General Electric Company, a corporation of New York Application December 24, 1942, Serial No. 470,048

3 Claims. (Cl. 250—27)

Our invention relates to pulse signalling systems and in particular to receiver circuits for such systems and it has for its object to provide an improved receiver circuit for a pulse signalling system.

Our invention relates more particularly to receiver circuits for pulse signalling systems which utilize the received pulses for operating a control circuit for a predetermined interval of time. In such systems it is frequently desired to employ the received pulses as a means to effect a control operation for a certain period of time or to sound a signal to indicate the occurrence of the pulse. When the receiver is used with a directive type of antenna, for example, it is desirable to indicate the fact that the antenna is properly trained. Also, if the antenna is of the rotating type, it is desirable to control the operation of the rotating mechanism in response to the presence or absence of a received pulse.

It is a further object of our invention to provide an improved pulse receiving system which effects the operation of a control device in response to a received pulse for a predetermined interval of time and which is capable of extending the period of operation of such device upon the reception of a succeeding pulse during said interval or any extension thereof.

Another object of our invention is to provide an improved receiver circuit of the aforesaid type which is responsive to a wide range of input signal intensities.

The features of our invention which we believe to be novel are set forth with particularity in the appended claims. Our invention itself, however, both as to its organization and method of operation, together with further objects and advantages thereof, may best be understood by reference to the following description taken in connection with the accompanying drawing, in which the single figure of the drawing represents one embodiment of our invention.

In the drawing, there is shown an antenna 10 for receiving a pulse of oscillations and supplying said oscillations, by means of the line 11, to an amplifier 12 having output circuits broadly tuned to the frequency of the oscillations. After further amplification in the amplifier 13, the pulse of oscillations is impressed on the circuit of a multivibrator 14. The output of the multivibrator 14 governs the operation of the control tube 15 in whose output circuit is connected a relay or similar operating device 16 whose operative condition it is desired to control. The multivibrator 14 and the control tube 15 are so constructed and arranged that, upon the reception of a pulse of oscillations, operation of the relay 16 is effected for a predetermined interval of time, which interval is extended upon the reception of another pulse by the antenna 10 during said predetermined interval of time or any extension thereof.

A transmitter 17 may be included in the system when the system is of the radio echo type. In this case the antenna 10 may be utilized for both sending and receiving signal pulses. In such a case, means 18 for producing a keying pulse may be used for controlling the operation of transmitter 17 and disabling, by means of a receiver gating device 19, the receiver during the periods of operation of the transmitter 17.

The antenna 10 may be of the directive type comprising a plurality of pairs of dipoles or radiators arranged in a single plane. It also may have means (not shown) for rotating the antenna. An antenna of the type shown is particularly desirable when the system operates at a high frequency of oscillation. In a system designed to be responsive to low frequencies, such as occur in the audio or supersonic range, the antenna 10 may be replaced by microphones or similar pick-up apparatus.

The pulses received on the antenna 10 are supplied through the receiver gating device 19 and capacitor 20 to the control electrode 21 of the amplifier 12. The amplifier 12 is shown to be of the pentode type having, in addition to the control electrode 21, a cathode 22, an anode 23, a screen electrode 24 and a suppressor electrode 25, the latter being directly connected to the cathode 22. The input circuit to amplifier 12 includes a grid resistor 26 and a cathode bias resistor 26' connected between the control grid 21 and cathode 22, resistor 26' being by-passed for alternating currents by capacitor 31'. The output circuit of this amplifier is broadly tuned, by the tuned circuit comprising the capacitor 27 and the inductance 28, to the frequency of oscillations of the pulses at which the circuit is designed to operate. The anode 23 and the screen grid 24 are supplied with operating potential from any suitable source, such as the battery 29, through a decoupling resistor 30 and are by-passed to the cathode by means of capacitor 31 for alternating currents.

The signal voltages appearing across the output circuit of amplifier 12 are coupled by means of capacitor 32 to the control electrode of the amplifier 13. The amplifier 13 likewise has been shown as of the pentode type, having a grid resistor 33 and a cathode bias resistor 38 connected between the control electrode and cathode with resistor 38 being by-passed for alternating currents by capacitor 39 and having the usual suppressor and screen grid connections. While the amplifier 13 has been shown as a single stage, it may comprise a plurality of stages of the tuned circuit coupling type. In the drawing, however, it is shown to be of the resistance-capacitance coupled type and employing a load resistor 34 and a coupling capacitor 35. Operating potential for the amplifiers may be provided from the battery 29 through the decoupling resistor 36, the by-pass capacitor 37 being connected between resistor 36 and ground potential.

Multivibrator 14 has been shown as employing three electron discharge devices, namely, a diode, a triode, and a pentode, all included in a single envelope. The signals from the output of the amplifier 13 are impressed across the diode elements comprising the anode 40 and the cathode 41. The diode has a load resistor 42 connected between the anode and cathode across which is developed a negative bias for the initial action on electrode 43 of the triode section of the multivibrator, the negative bias developed across resistor 42 being supplied to the electrode 43 through the coupling resistor 44. The triode portion of the multivibrator, in the absence of a signal in the output of amplifier 13, is normally conductive, operating potential for the anode 45 being supplied thereto from the battery 29 through the load resistor 46, the alternating current decoupling capacitor 47 being provided between the anode 45 and ground.

The pentode portion of the multivibrator, in the absence of a pulse of signal to the receiver, is normally non-conducting, the control electrode 48 being biased highly negatively by means of the battery 49 through grid resistors 50 and 51. The control electrode 48 is likewise coupled to the output circuit of the triode by means of capacitor 52. Operating potential for the anode 53 and screen electrode 54 of the pentode section of the multivibrator is provided from the battery 29 through the fixed resistor 55 and variable resistor 56. The anode 53 is likewise coupled to the control electrode 43 of the triode portion of the multivibrator by means of the capacitor 57 and is by-passed to ground for alternating currents by means of capacitor 58.

The control tube 15 for operating the control device 16 is shown as a pentode which, in the absence of a signal pulse in the receiver, is normally conductive to pass current through the winding of the device 16. The control electrode 60 of tube 15 is directly connected to the output circuit of the pentode portion of the multivibrator 14. The cathode 62 of device 15 is maintained at a relatively high potential, being connected to the intermediate tap 61 of the battery 29, the same tap which supplies potential for the operation of the amplifiers 12 and 13 and the pentode portion of the multivibrator 14. The control electrode 60 and cathode 62 of the tube 15 are thus normally at the same potential, both electrodes being connected to the tap 61 of battery 29. Operating potential for the anode of device 15 is supplied from the positive terminal of battery 29 through the winding of the control device 16, the capacitor 63 being provided to by-pass alternating currents between the anode and cathode of the tube 15. The control device 16 is shown as a relay and may have a plurality of contacts 64 connected to any desired utilization circuits, not shown.

In the operation of the pulse receiver circuit thus far described, when a pulse is received on the antenna 10, oscillations of the frequency to which the output circuit of the amplifier 12 is tuned are developed thereacross, further amplified in the amplifier 13, and impressed across the diode elements 40 and 41 to cause rectification currents to flow through resistor 42. The rectified voltages developed across resistor 42 are impressed upon the control electrode 43 to reduce current flow in the triode portion of the multivibrator 14. A relatively strong signal biases the triode to its cutoff point, while a substantially weaker signal sufficiently reduces the conduction current in the triode to initiate a multivibrator action.

Upon the substantial decrease of current in the triode section of the multivibrator, there is a rapid rise of potential of the anode 45 because of the decrease in the potential drop across load resistor 46. This rising potential is supplied by action of condenser 52 to control electrode 48 of the pentode section of the multivibrator which was previously biased negatively by the battery 49. The positive impulse supplied to the electrode 48 through the capacitor 52 is sufficient to initiate current flow in the pentode portion of the multivibrator, the potential of the anode 53 decreasing rapidly due to the flow of current through the load resistors 55 and 56. The decrease in potential occurring at the anode 53 is supplied by means of condenser 57 back to control electrode 43 to cut off completely current flow in the triode. In this manner the potentials of anode 45 and of control electrode 48 always rise to about the same maximum value causing a large flow of current in the pentode section of the multivibrator.

The rapid drop in potential of anode 53 is likewise supplied to grid 60 of control tube 15 and drives this grid negatively with respect to cathode 62, stopping the flow of current in the tube 15 and changing the operative condition of the control device 16. Capacitor 58 is likewise affected by the decrease in potential of anode 53. Prior to the occurrence of the negative pulse of voltage at anode 53, this capacitor is charged to the full voltage between ground and the tap 61 on battery 29. With the negative swing of potential of anode 53, this charge on condenser 58 is reduced and the potential thereacross is the voltage which appears between anode 53 and cathode 41.

Capacitor 52 has a very small value of capacity and recharges rapidly through the series circuit comprising resistor 50 and battery 49 restoring control electrode 48 to its normal condition of a high negative potential and cutting off the flow of current through the pentode portion of the multivibrator. Anode 45 also recovers rapidly due to the short time constant of resistor 46 and capacitor 47. The recovery time of control grid 43, that is, the time required for this grid to return to a bias such that conduction in the triode is resumed, is determined by the time constant of capacitor 57 in series with capacitor 58 between grid 43 and ground, resistors 44 and 42 forming a discharge path for these capacitors to return grid 43 to the proper bias potential. Capacitor 58 is large compared to capacitor 57, so, essentially, the recovery time is determined by the values of capacitor 57 and resistors 44 and 42. This recovery time is made longer than the recovery time of the grid 48 of the pentode portion of the multivibrator so that the regenerative action of the multivibrator is limited to one-half of a cycle of operation, the pentode being cut off before current flow in the triode is resumed. As a matter of fact, the various circuits of the multivibrator and the control tube 15 are so interrelated that each, to a certain extent, affects the length of operation of the others. Essentially, however, the operation is as described above.

The time of operation of the control device 16, that is, the interval of time during which the tube 15 is not conducting, is determined by the time constant of capacitor 58 and resistors 55 and 56 and is equal to the time required to charge capacitor 58 sufficiently positive that the bias of electrode 60 rises well above the cutoff point and the minimum current flow in device 16 is resumed. In order to make the period of operation of the device 16 a relatively long time, capacitor 58 is made quite large, for example, 0.5 microfarad, and resistors 55 and 56 are made relatively large. In order, also to provide means for adjusting the interval of operation of the device 16, resistor 56 is made a variable resistor so that the time constant of the grid circuit of tube 15 may be adjusted to a desired value. For example, if, when the capacitor 58 has the above-mentioned value, resistor 55 has a value of 220,000 ohms and resistor 56 is an adjustable resistor having a total resistance value of 2 megohms, the duration of the period of operation of device 16 may be adjusted between .1 and 1.1 seconds or actually more than this due to the tube characteristics also entering into the time constant.

During the period of operation of the device 16, if a second pulse is received by the antenna 10, this second pulse again is amplified in the manner previously described and is impressed across the diode elements 40, 41. Since the multivibrator has now returned substantially to its normal condition, the triode having returned to its normal operating condition while the potential of the anode 53, being equal to the voltage across capacitor 58, has returned only partly toward its normal value, current flow through the triode is again reduced and control electrode 48 is made sufficiently positive that the pentode portion of the multivibrator again becomes conductive and the potential of the anode 53 is lowered further. The previously described half cycle of multivibrator action is thus repeated. The charge accumulated on capacitor 58 during the time between received pulses is removed during this half cycle and the period of operation of device 16 is extended. It is thus seen that the time of operation of the device 16 may be extended indefinitely by the reception of pulses by antenna 10 at any time prior to the resumption of current flow in control tube 15. Thus, for example, if the interval of operation of device 16 is set at one second and pulses are received by antenna 10 at intervals spaced one-half second apart, the control device 16 is operated continuously so long as the pulses are being received. Should the incoming pulses cease for a period of time equal to said predetermined interval, the bias of control tube 15 rises sufficiently above the cutoff point so that sufficient current flow in tube 15 is resumed to restore control device 16 to its original operative condition.

When our invention is employed in a system of the radio echo type, that is, a system in which transmitter 17 supplies periodically recurring pulses to the antenna 10 to be radiated therefrom and is then rendered inoperative while these pulses of radiated energy impinge upon a distant reflecting surface to produce echoes which are received by the antenna to initiate an operation of the multivibrator 14 and to effect a change in the operative condition of control device 16, preferably, the transmitter 17 is connected with a source of keying pulses 18. Also, preferably, the receiver portion of the system is provided with means, represented by the rectangle 19, to prevent pulses generated by the transmitter from objectionably affecting the receiver because of their high intensities. The transmitter 17, the source of keying pulse 18, and the receiver gating device 19 form no part of our invention and any conventional means for such purposes may be employed. The receiver gating device, for example, may be either means to short circuit the input circuit of the receiver to ground during periods of operation of the transmitter or means to provide a high negative bias for the receiver tubes during such periods. In such a system, for example, if the transmitter 17 radiates pulses, each .01 second long, at intervals spaced, say, one-half second apart, when the antenna 10 is directed toward a reflecting object, the radiated pulse impinges upon said reflecting object and an echo pulse returns to the antenna 10 to initiate the operation of the multivibrator 14 and effect an operation of the relay 16. In such a case, when the antenna 10 is directed toward the reflecting object, echo pulses are received by the antenna at intervals spaced approximately one-half second apart. If, therefore, the time constant of the circuit comprising the capacitor 58 and resistors 55 and 56 is adjusted for an interval greater than one-half second, current flow through the tube 15 is cut off so long as the antenna is directed toward the reflecting object and the change in the operative condition of device 16 is maintained as long as the echo pulses are received.

While we have shown in the foregoing a particular embodiment of our invention, it will be apparent to those skilled in the art that the invention may be modified and is applicable to many other uses. It will be understood, therefore, that we do not wish to be limited to the specific embodiment and use shown since various modifications may be made and we contemplate by the appended claims to cover all such modifications as fall within the true spirit and scope of the invention.

What we claim as new and desire to secure by Letters Patent of the United States is:

1. In a receiver for spaced pulses of high frequency oscillations, a pair of electron discharge devices, a first of said devices having an input circuit including a first resistance and an output circuit connected to the input circuit of said second device, said second device having an output circuit coupled to the input circuit of said first device through a first capacitor, said first device being biased normally to cause an anode current to flow therein, means for biasing the input circuit of said second device so that said second device is normally non-conductive, means for rectifying a received pulse to produce across said resistance a negative voltage to render said first device non-conductive, the connection between the output circuit of said first device and the input circuit of said second device including a capacitance, whereby said second device is rendered conductive when anode current flow in said first device is interrupted, a control device coupled to the output of said second device, means including a second resistance included in the output circuit of said second device for altering the operative condition of said control device, a second capacitor connected in series with said second resistance and across said second device, the time constant of said second capacitor and said second resistance being such that said control device is maintained in its altered operative condition for a predetermined interval of time after the reception of a pulse of oscillations, the time constant of said first capacitor and said first resistance being less than the time constant of said second capacitor and said second resistance, whereby upon reception by said receiver of a second pulse of oscillations during said predetermined interval the duration of said interval is extended.

2. In a receiver for spaced pulses of electrical oscillations, a multivibrator connected therewith and operated thereby upon reception of a pulse of oscillations to produce a pulse of voltage, said multivibrator comprising first and second electron discharge devices, said first electron discharge device having an input circuit including a first resistance and said second electron discharge device having an input circuit coupled to the output circuit of said first device, said first device being normally conductive, means for biasing the input circuit of said second device normally to render said second device non-conductive, means for rectifying a received pulse of oscillations to produce across said resistance a negative voltage to render said first device non-conductive, means coupling the input circuit of said second device to the output circuit of said first device to produce a flow of anode current in said second device, a control device coupled to said second device, means including a second resistance connected in the output circuit of said second device for altering the operative condition of said control device for a predetermined interval of time when current flow in said second device is initiated, a first capacitance connected between the input circuit of said second device and said first resistance, and a second capacitance connected in series with said second resistance and across said second device, the time constant of said second resistance and said second capacitance being greater than the time constant of said first resistance and said first capacitance, said multivibrator being adapted upon reception of another pulse of oscillation during said predetermined interval to produce another pulse of voltage to extend the duration of said interval.

3. In a receiver for spaced pulses of electrical oscillations, a multivibrator connected therewith and operated thereby upon the reception of a pulse of oscillations to produce a pulse of voltage, said multivibrator comprising first and second electron discharge devices, said first device having an input circuit including a first resistance, said first device being normally conductive and having an output circuit coupled to the input circuit of said second device, means for rectifying a received pulse of oscillations to produce a negative voltage across said first resistance to render said first device non-conductive, said second device having an output circuit coupled to the input circuit of said first device through a first capacitance, means biasing said second device normally to a non-conductive condition, a third electron discharge device having an input circuit including a second resistance, said second resistance being connected in series with the output circuit of said second device, the input circuit of said third device being normally biased to permit the flow of anode current therein, a second capacitance connected in series with said second resistance and across said second device, said second capacitance and said second resistance being effective to cut off current flow in said third device upon the flow of anode current in said second device and having a time constant sufficient to maintain said cut-off condition for a predetermined interval of time, the time constant of the input circuit of said first device being shorter than the time constant of said second resistance and said second capacitance, whereby a pulse of oscillations appearing in said receiver during said predetermined interval is effective to increase said interval of time.

ARTHUR G. MANKE.
PAUL C. GARDINER.

REFERENCES CITED

The following references are of record in the file of this patent:

UNITED STATES PATENTS

| Number | Name | Date |
|---|---|---|
| 2,050,059 | Koch | Aug. 4, 1936 |
| 2,193,850 | Andrieu et al. | Mar. 19, 1940 |
| 2,272,070 | Reeves | Feb. 3, 1942 |
| 2,280,421 | Chappell et al. | Apr. 21, 1942 |
| 2,373,145 | Sensiper et al. | Apr. 10, 1945 |
| 2,402,916 | Schroeder | June 25, 1946 |

FOREIGN PATENTS

| Number | Country | Date |
|---|---|---|
| 356,111 | Great Britain | Aug. 24, 1931 |

OTHER REFERENCES

Ultra-High Frequency Techniques by Brainerd et al., 1942, pages 176–177, published by Van Nostrand. (Copy in Division 51.)

Journal of the Institution of Electrical Engineers, June 1942, Time Bases by Puckle, page 110. (Copy in Division 51.)

Review of Scientific Instruments, vol. 12, Feb. 1041, "The Interval Selector . . ." by Roberts, pages 71–76. (Copy in Scientific Library.)